(12) United States Patent
Bugenhagen

(10) Patent No.: US 8,064,881 B2
(45) Date of Patent: Nov. 22, 2011

(54) SYSTEM AND METHOD FOR REMOTELY MANAGING WIRELESS DEVICES

(75) Inventor: Michael K. Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 647 days.

(21) Appl. No.: 11/711,997

(22) Filed: Feb. 28, 2007

(65) Prior Publication Data

US 2008/0207167 A1 Aug. 28, 2008

(51) Int. Cl.
*H04M 1/66* (2006.01)
(52) U.S. Cl. ......... 455/411; 455/406; 455/407; 455/408
(58) Field of Classification Search .......... 455/406–408, 455/411, 418–420, 432.3, 433, 435.1
See application file for complete search history.

(56) References Cited

U.S. PATENT DOCUMENTS

| 7,239,877 | B2 * | 7/2007 | Corneille et al. | 455/456.3 |
| 2002/0076015 | A1 * | 6/2002 | Norwitz et al. | 379/93.09 |
| 2002/0154751 | A1 * | 10/2002 | Thompson et al. | 379/114.01 |
| 2004/0010563 | A1 * | 1/2004 | Forte et al. | 709/215 |
| 2006/0104306 | A1 * | 5/2006 | Adamczyk et al. | 370/466 |
| 2008/0082375 | A1 * | 4/2008 | Kennis et al. | 705/7 |

* cited by examiner

*Primary Examiner* — Jean Gelin
*Assistant Examiner* — Michael Nguyen
(74) *Attorney, Agent, or Firm* — SNR Denton US LLP

(57) ABSTRACT

A system and method for providing wireless services. One or more wireless identifiers are stored in an authentication space of a server associated with a wireless service provider. The authentication space is associated with an enterprise. A remote client is granted access to the authentication space to allow the enterprise to manage services associated with the one or more wireless identifiers. Managed service options associated with the one or more identifiers are selected. The managed service options are selected in response to receiving data from the remote client.

22 Claims, 6 Drawing Sheets

FIG. 2A

```
┌─────────────────────────────────────────────────────────────┐
│         Enterprise Graphical User Interface    200          │
├─────────────────────────────────────────────────────────────┤
│                                                             │
│   ☑   Adds      206      202  ┌─────────┐  ┌─────────┐      │
│                               │Username │  │ Mbug    │      │
│                               └─────────┘  └─────────┘      │
│                          204  ┌─────────┐  ┌─────────┐      │
│                               │Password │  │ ******* │      │
│                               └─────────┘  └─────────┘      │
│   ☐   Moves     208      205  ┌─────────┐  ┌─────────┐      │
│                               │Company ID│ │ 24548   │      │
│                               └─────────┘  └─────────┘      │
│                                                             │
│                                                             │
│   ☐   Changes   210                                         │
│                                                             │
└─────────────────────────────────────────────────────────────┘
```

FIG. 2B

```
┌─────────────────────────────────────────────────────────────────┐
│         Enterprise Graphical User Interface    200              │
├─────────────────────────────────────────────────────────────────┤
│                                                                 │
│        Mobile Identifier         ┌──────────────────┐▼          │
│                                  │ 8efX29665p4add9  │   212     │
│                                  └──────────────────┘           │
│        Home Number Assignment    ┌──────────────────┐▼          │
│                                  │ 999-999-9999     │   214     │
│   216  ☑  Customize services     └──────────────────┘           │
│                                                                 │
│              ☑  Caller Identification          218              │
│              ☐  Three-way calling              220              │
│              ☑  Text messaging                 222              │
│              ☑  Internet Access                224              │
│              ☐  Call forwarding                226              │
│              ☑  Email/Synchronization to work computer  228     │
│              ☐  Push to talk                   230              │
│                                                                 │
└─────────────────────────────────────────────────────────────────┘
```

FIG. 2C

| Enterprise Graphical User Interface | 200 |
|---|---|
| Miscellaneous Features | |

| | | |
|---|---|---|
| ▭ | Device Audit | 236 |
| ▭ | Geographic location services | 238 |
| ▭ | Announcement System | 240 |
| ▭ | Dialing functions | 242 |
| ▭ | Intercom | 244 |
| ▭ | Voicemail | 246 |
| ▭ | Billing | 248 |
| ▭ | Emergency Dialing | 250 |
| ▭ | Phonelist | 252 |
| ▭ | Import/Export | 254 |
| ▭ | Other | 256 |

SYSTEM AND METHOD FOR REMOTELY MANAGING WIRELESS DEVICES

BACKGROUND

Wireless communications has grown nearly exponentially in recent years. The growth is fueled by larger networks with more reliable protocols and better communications hardware available to service providers and consumers. Many companies, organizations, and individuals are becoming increasingly reliant on wireless and mobile communications. For example, many companies issue employees wireless devices, such as cellular phones, a Blackberry®, personal digital assistants (PDA), laptops, evolution data optimized (EDO) cards, multi-mode devices, and other wireless communications elements. Frequently, individuals and organizations depend on communications to carry on conversations with other individuals, perform business activities, and send files, email, information and other data, for sharing voice and data.

When an individual begins working with a new organization or job, it may be days or weeks before a new wireless device is obtained from a wireless carrier for use by the individual. In many cases, this waiting period is extremely frustrating to the individual that needs the device. Many times wireless communications are so important or necessary for an individual and organization that a user may use a personal wireless device despite the personal cost and inconvenience. If the individual is unable to use a personal wireless device, other less convenient, means of communication must be used.

Additionally, organizations experience changing needs that are difficult to meet. For example, the organization may lose or gain numerous employees at any given time requiring that new numbers, identifications, or services be added or deleted for existing or inactive devices. In other cases, an individual may need new features, such as increased wireless minutes, caller identification, and conference calling in order to properly carry out assigned responsibilities. Waiting for the wireless service provider to make the requested changes to add, delete, or modify services may be frustrating, time consuming, and expensive for many users deterring the organization from more effectively using wireless devices. The organization may also forego making changes that would better suit the organization's needs because of the overall cost.

SUMMARY

In one embodiment of the present invention, a system and method for providing wireless services is disclosed to provide a consumer enterprise the ability and convenience of controlling and configuring a number of wireless devices. One or more wireless identifiers are stored in an authentication space of a server associated with a wireless service provider. The authentication space is associated with an enterprise. A remote client is granted access to the authentication space to allow the enterprise to manage services associated with the one or more wireless identifiers. Managed service options associated with the one or more identifiers are selected. The managed service options are selected in response to receiving data from the remote client.

Another embodiment includes a wireless management system for providing wireless services. The system includes a first server associated with the management of wireless services provided by a wireless network. The first server includes an authentication space and the first server is operable to authenticate an enterprise communicating with the first server using a remote client. The first server communicates an interface to the remote client for receiving user input. The systems further includes a second server operable to receive commands from the first server in response to the received user input. The second server is operable to perform managed service options for a plurality of wireless devices based on the commands.

Yet another embodiment includes a method for providing wireless services. Access is granted to an authentication space of a server in response to a request from a remote client associated with an enterprise. The method verifies that a mobile identifier of a wireless device is associated with the authentication space. The mobile identifier is identified by the remote client. A managed service option is received for the wireless device from the remote client. The managed service option is implemented to configure the wireless services.

BRIEF DESCRIPTION OF THE DRAWINGS

Illustrative embodiments of the present invention are described in detail below with reference to the attached drawing figures, which are incorporated by reference herein and wherein:

FIG. 2A-C is a representation of a network host and an enterprise graphical user interface in accordance with the illustrative embodiments of the present invention;

DETAILED DESCRIPTION OF THE DRAWINGS

Figure 1:
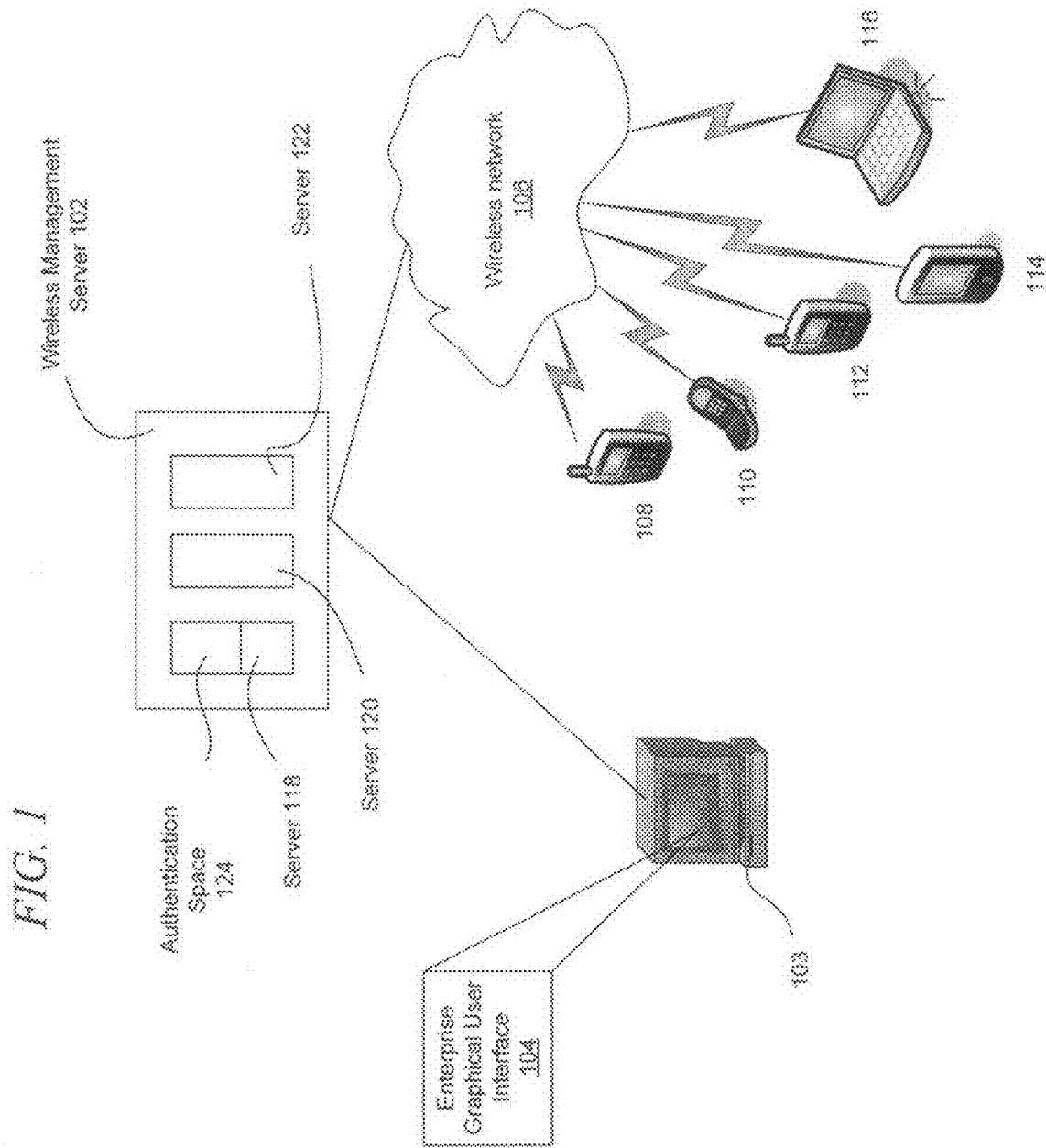
FIG. 1 is a pictorial representation of one embodiment of a wireless management client system implemented in accordance with the present invention.

FIG. 1 is a pictorial representation of one embodiment of a wireless management system in accordance with the illustrative embodiments of the present invention. The wireless management system 100 of FIG. 1 includes a wireless management server 102, a remote client 103, an enterprise graphical user interface (GUI) 104, a wireless network 106, and wireless devices 108, 110, 112, 114, and 116. The wireless management system 100 is a combination of hardware and software that allows a consumer enterprise to perform administrative options for the services and features of the wireless devices 108, 110, 112, 114, and 116. The wireless management server 102 may be software modules, a server, or other integrated or communicating network devices that are used to provide certain aspects of the wireless functionality of the wireless network 106. The wireless management server 102 may be a single component or may be multiple interconnected devices as shown in the embodiment of FIG. 1. The wireless management server 102 includes servers 118, 120, and 122. The wireless management server 102 may also include intelligent network devices, components and corresponding software for performing the functions of a mobile switching center (MSC), wireless access network switching network or wireless public exchange.

The wireless management server 102 performs administrative options in response to input received from the remote client 103. Administrative options shall mean managed service options and account options for purposes of this application. For purposes of this application, managed service options shall mean adds, moves, and changes.

Adds are additions or assignments of new wireless devices and their associated employees or contractors to one or more of a block of telephone numbers that have been allocated to a particular consumer enterprise. For example, an enterprise may buy a batch of new wireless telephones to support a group of newly hired employees. Each of such new wireless telephones may be assigned to a telephone number allocated to the enterprise.

Moves are movements of telephone numbers between wireless devices. For example, when a consumer enterprise hires a new employee such employee may be given a wireless device previously used by a former employee. In such instance, the old telephone number used by the former employee may be moved from the wireless device and routed directly to a voicemail indicating that the employee is no longer with the enterprise for a specified period of time. A new telephone number may then be moved to the wireless device for use by the new employee.

Changes are options that are made to modify how the keys of a wireless device are mapped to wireless services. For example, a push-to-talk button on a telephone may be mapped or otherwise configured or routed to connect to a talk group A instead of a talk group B.

For purposes of this application, account options shall mean options to review billing or usage information, change service plans, obtain software updates, subscribe to or remove a subscription to additional services and perform other services associated with wireless services other than managed service options The server 118 may include an authentication space 124. The authentication space 124 is a partition of the server 118 or other storage designated for use by the enterprise. The wireless management system 100 may include any number of remote clients and corresponding authentication spaces. The server 118 may accommodate any number of authentication spaces and partitions for use by different remote clients based on capacity and the block of numbers provisioned.

The illustrative embodiments are intended for use by consumer enterprises rather than wireless resellers or virtual network operators. As a result, the consumer enterprise has full control of administration and security of its wireless devices that is governed by a service agreement between the consumer enterprise and wireless service provider. Any number of consumer enterprises may use standard or specialized remote clients to make changes on the wireless management server. The enterprises may be added or removed as needed providing an easily scalable technology that allows the wireless service provider to cater to customers in a different way. In one embodiment, the wireless service provider may charge a flat fee per wireless device or wireless identifier that allows the enterprise to make changes for the wireless devices as often as desired or necessary. Embodiments of the present invention may be particularly useful if the enterprise has dynamic needs or high turnover, for the price of a flat fee, any number of configuration changes may be made. Many enterprises that rely on communications may be willing to pay a premium for the ability for control and implement immediate administrative options updates.

The wireless management server 102 performs administrative options and configuration changes for the wireless network 106, either by acting as a gateway, proxy, centrex, or interface into the wireless systems. In particular, the wireless network 106 broadcasts wireless signals to the wireless devices 108, 110, 112, 114, and 116. The wireless devices 108, 110, 112, 114, and 116 may be any number of wireless devices including cellular phones, a Blackberry®, personal digital assistants (PDA), laptops, evolution data optimized (EDO) cards, multi-mode devices, and other wireless communications elements. The wireless network may use any number of wireless communication formats including, but not limited to, code division multiple access (CDMA), global system for mobile (GSM) communications, WiFi and WiMAX. The servers 118, 120, and 122 specify how and when the wireless devices 108, 110, 112, 114, and 116 communicate with other devices over the wireless network 106, and with other wireless networks, publicly switched networks, data networks, such as the Internet, and other public and private communications networks.

Once the enterprise customer submits managed service options or commands to the wireless management server 102 from the remote client 103, the changes may be sent in updates, programs, commands, messages, or signals (hereafter collectively "commands") to the wireless network 106 for implementation of changes to one or more of the wireless devices 108, 110, 112, 114, and 116. In other embodiments, the wireless devices 108, 110, 112, 114, and 116 may be connected directly to the remote client 103 for making the specified changes. In another embodiment, the wireless management server 102 or server 120 may be a network management server or software module for performing the commands received from the remote client 103. The network management server may ensure that the administrative options sent from the remote client 103 are implemented for the wireless devices 108, 110, 112, 114, and 116. The network management server may convert the commands received from the remote client 103 to a format that may be used by the 108, 110, 112, 114, and 116 to implement the configurations.

The wireless management server 102, the wireless network and the remote client 103 may communicate using a wired or wireless connection. For example, the remote client 103 may be connected to the wireless management server 102 by a fiber optic connection, T1, cable, DSL, satellite, high-speed trunk, or wireless connection. The wireless management server 102 and the remote client 103 may be performed using any number of communications protocols. In one embodiment, the communication is a common channel signaling system 7 (SS7). SS7 refers to the exchange of information between communications components required to provide and maintain service. The SS7 protocol is used by broadband networks to establish connections between switches and other devices in order to perform call-establishment, billing, routing, and information-exchange functions of the network. The communications may also be based on transmission control protocol (TCP) and Internet protocol (IP) standards. The remote client 103 and components of the wireless management server 102 may be an artificial intelligence network (AIN) device. AIN devices allow the wireless management server 102 and remote client 103 to quickly and economically create and modify telecommunication services provided through the wireless network 106 for the enterprise. For example, the wireless management server 102 may register the remote client 103 for receiving commands in the form of administrative options. The wireless management server may also update a virtual locator record (VLR) and home locator record (HLR) based on information received from the remote client 103. Alternatively, the wireless management server 102 may update a signaling control point using SS7 signaling or other similar protocols for call handling.

The wireless management server 102 is configured so that a block of numbers or specified wireless devices are provisioned for use by an enterprise. The wireless management server 102 may be operated by a wireless service provider that has access to wireless infrastructure, such as a home network operator (HNO) or mobile phone operator. The enterprise may be a business, school, organization, town, municipality, association, or other group. The enterprise is granted control over those numbers or devices through a specific computing device, secure software client, or other interface element such as remote client 103. In one example, the remote client 103 is a personal computer loaded with a software client and the enterprise GUI 104 to access the authentication space 124. In another embodiment, the remote client 103 is a secure client executed by a data processing system to perform the features and tasks described herein. Alternatively, the remote client 103 may be a website accessed by the enterprise in order to perform the managed service options. The wireless management server 102 may include a host client application for managing communication with one or more remote clients.

A user may access the enterprise GUI 104 in order to manage service options. Managing service options include performing adds, moves and changes for specified wireless devices. A user may be first required to provide a secure identifier, such as a user name, password, or other authentication code or hardware interface that verifies the user is authorized to make changes within the authentication space 124. This authentication information may be used to create a secure connection between the remote client 103 and the wireless management server 102. The secure connection may be a virtual private network tunnel, an encrypted connection, firewall, or other form of secured communications link.

Once connected, the user may use the options, screens, and modules of the enterprise GUI 104 to make adds, moves, and changes, perform administrative tasks, review billing information, and perform other tasks that are allowed within the authentication space 124. The authentication space 124 of the server 118 is configured so that the remote client 103 may only make changes to wireless devices controlled by the authentication space 124. Information entered into the enterprise GUI 104 may be obtained in any number of ways. In one embodiment, a user accessing the remote client 103 manually enters all data into the enterprise GUI 104. In another embodiment, the remote client 103 may include a bar code scanner for scanning information from the wireless device. Alternatively, the remote client 103 may include an infrared or Bluetooth® scanner for detecting and extracting wireless information from the wireless device using a Bluetooth or other wireless signal. Wireless devices may also be connected to the remote client 103 using an electronic interface to identify, register and configure the wireless device.

FIG. 2A-C is a representation of a network host and an enterprise graphical user interface in accordance with the illustrative embodiments of the present invention. The enterprise graphical user interface (GUI) 200 may be displayed to a user on the remote client 103 of FIG. 1. Enterprise GUI 200 may be a program application, web interface, software module, or other graphical interface for interacting with an administrator or other user. The enterprise GUI 200 is a particular implementation of enterprise GUI 104 of FIG. 1. The enterprise GUI 200 may be communicated to the remote client from a network management server or may be stored, processed, and executed separately by the remote client. For example, the enterprise GUI 200 may be accessible using an Internet web browser using a secured or authenticated connection.

A user may open the enterprise GUI within or as part of the remote client and enter authorization information that allows the wireless management server 102 of FIG. 1 to verify the user and/or remote client is authorized to make adds, moves, changes, or perform administration tasks. In one embodiment, a user may be required to enter a user name 202, password 204, and company identification 205. This authorization information is sent to the wireless management server in order to grant the remote client and enterprise GUI 200 access to the authorization space of the wireless management server. A secure communication connection, link or session is then established between the remote client and wireless management server which allows the enterprise GUI to perform operations, maintenance, and administrative functions for a group of wireless devices or numbers. The company identification 205 may specify the type of changes that may be made based on a prior agreement between the enterprise and wireless service provider.

The secure connection allows a user to perform managed service options which may include adds 206, moves 208, and changes 210 for a number of wireless devices via the enterprise GUI 200. The user may select to make, adds, moves, or changes using icons, buttons, drop-down menus, shortcuts, or other graphical representations. The user may interact with the enterprise GUI using a mouse, a keyboard, microphone, or other similar peripheral device in communication with the remote client.

Any number of windows or views may be displayed within the enterprise GUI 200 based on user selections. In one embodiment, the enterprise GUI of FIG. 2B may be displayed to a user in order to perform specific operations or tasks that require more specific information and user input. The user may need to enter or select a mobile identifier 212 or a home number assignment 214. As part of a service agreement between an enterprise/customer and a wireless service provider, the enterprise may be assigned a block of numbers corresponding to the home number assignment 214 or a number of wireless devices corresponding to the mobile identifier 212.

For example, as an example of an "add," a newly hired employee of an enterprise may need an enterprise issued wireless device such as a multi-mode cellular phone. A new cellular phone may be selected by an information technology (IT) administrator. The corresponding mobile identifier 212 is entered into the enterprise GUI 200. Next, the IT administrator selects an available phone number as the home number assignment 214. The multi-mode cellular phone is activated by the wireless management server for service through a wireless network. As a result, the newly hired employee may use a cell phone that only minutes before was not activated and did not have a wireless number assigned. The cellular phone may also be pre-programmed with direct line features so the newly hired employee may speak to management, sales, or engineering at any time by selecting a direct dial button, feature, or option.

Alternatively, as an example of a "move," the IT administrator may use a wireless device that was used by a previous employee and reassign the wireless device to the newly hired employee. For example, the IT administrator may designate a new home number assignment 214 if available, an email address, and other personal information and features for the cell phone. The enterprise GUI 200 may be used to change call routing or the porting of a telephone number from one phone to another based on time of day, call volume, line status, availability, and any user controlled parameters. For example, the enterprise may select to have customer calls routed from a 1-800 number to specified wireless devices or technical support calls may be routed to other numbers after 6:00 p.m.

Additionally, the IT administrator may use the enterprise GUI 200 to customize services 216. The customized services 216 shown in FIG. 2B are shown for purpose of example only and are not intended to limit or otherwise constrain the use of the enterprise GUI 200 for designating any number of potential settings, features, and configurations. In the enterprise GUI 200 illustrated in FIG. 2B the customized services 216 may include caller identification 218, three-way calling 220, text messaging 222, Internet access 224, call forwarding 226, email/synchronization to work computer 228, and push to talk 230 features. In one example, a wireless device linked with the mobile identifier 212 may be configured to enable caller identification 218, text messaging 222, Internet access 224, and email/synchronization to a work computer 228.

The enterprise GUI 200 of FIG. 2C illustrates various miscellaneous features 234 which may include device audit 236, geographic location services 238, announcement system 240, dialing functions 242, intercom 244, voicemail 246, billing 248, emergency dialing 250, phone list 252, import/export 254, and other 256. These features are listed as examples and not as limitations.

The miscellaneous feature 234 may be used to set features, settings, preferences, or access for a single wireless device, all wireless devices, or groups of wireless devices over which the enterprise GUI 200 has control. The device audit 236 may be used to determine which wireless devices or mobile numbers are active, the assigned phone number, and designated features. For example, the device audit 236 may be used to view and/or print the summary of information for wireless devices managed from the enterprise GUI 200.

The geographic location services 238 may enable geo-directional functions, such as global positioning, cellular triangulation, and other location or proximity services. The announcement system 240 and intercom 244 may be used to send stored messages or live messages to the wireless devices, respectively. Dialing functions 242 may specify whether the wireless devices are enabled for speed dialing or may set shortcuts for dialing that are uniform for all wireless devices or customized based on need and preference.

Voicemail 246 may enable one or more of the wireless devices to receive voicemail and set preferences and configuration. Billing 248 may allow a user to view charges, minutes used, incoming and outgoing calls, estimates, and other costs associated with a service agreement between the enterprise and a wireless service provider. The costs may be fixed, such as a flat rate per minute or line, or may dynamically change based on the number of wireless devices enabled, features, and other miscellaneous factors. The billing 248 may be very useful for budgeting and planning purposes. Additionally, billing 248 may be used to pay a bill or pass along a portion of expenses or costs to an employee or wireless user by generating bills and invoices. In one embodiment, the wireless device may be used to pay for services, such as cafeteria food, items from vending machines, and other items that may be paid for using the wireless device. All or portions of the bill for non-necessary expenses may be passed to the wireless user or deducted from his/her paycheck.

Emergency dialing 250 establishes the emergency dialing preferences and configuration, but may not disable emergency calling. For example, the wireless device may be configured to send a text message to the enterprise if an emergency call is made.

The phone list 252 may be used to pre-program phone numbers or incorporate directories. The phone numbers of the phone list 252 may be numbers for contacting employees, supervisors, IT administrators, clients, or other individuals. For example, a company may include a number and other contact information for each company employee that may be manually or automatically saved to the wireless device.

The Import/Export 254 feature may allow an IT administrator using the enterprise GUI 200 to import or export data and information to specified wireless devices. For example, the import/export feature may be used to import bookmarks for web resources typically used by enterprise employees. Import/Export 254 may also set permissions that allow a user to import or export data, such as contact lists, email accounts, files, programs and other data.

The other 256 feature may allow the IT administrator to access account options, administrative features, or other options that are not frequently used or require additional verification, clearance, or permissions to change.

Figure 3:
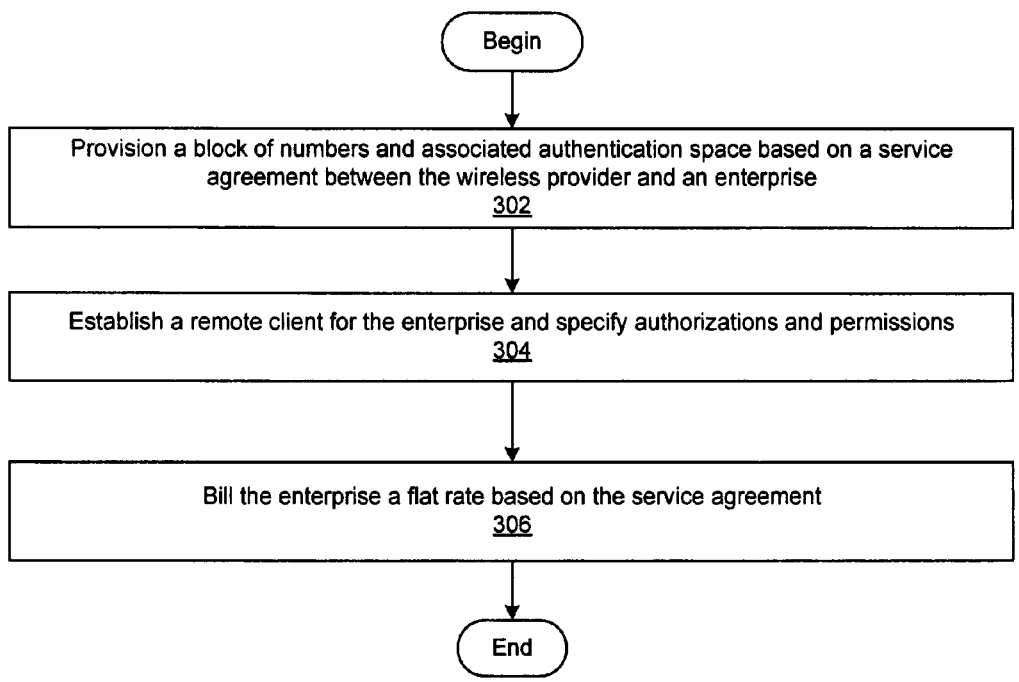
FIG. 3 is a flowchart of a process for establishing a remote client in accordance with the illustrative embodiments of the present invention.

FIG. 3 is a flowchart of a process for establishing a remote client in accordance with the illustrative embodiments of the present invention. The process of FIG. 3 may be implemented by a wireless management system, which may include a remote client displaying an enterprise GUI, a wireless management server, a wireless network and any number of wireless devices that communicate through wired or wireless connections.

The process of FIG. 3 begins by provisioning a block of numbers and associated authentication space based on a service agreement between the wireless provider and an enterprise (step 302). Step 302 may be performed by a wireless management server based on input from an administrator of the wireless management client and wireless network. The block of numbers may be associated with a number of wireless devices. For example, if an organization currently uses eighty five wireless devices, but anticipates within the next two years the need will be approximately one hundred wireless devices, a block of numbers for one hundred wireless devices may be provisioned. The block of numbers required by the enterprise indicates the amount of authentication space that may be required. For example, the authentication space may be memory or a partition of one or more servers that are part of or integrated with the remote wireless management server. As a result, dedicated servers or devices are not required to support the wireless management client.

Next, the wireless management server establishes a remote client for the enterprise and specifies authorizations and permissions (step 304). The wireless management server may establish a remote client in any number of ways. For example, the remote client may be a web interface, a program application, or a virtual private network connection that is established between a remote device and the wireless management client. Alternatively, the remote client may be a specialized data processing system designated for establishing a secure connection with the wireless management server. In either embodiment, authorizations and parameters may specify an authentication policy, such as identifiers, usernames, and passwords for accessing the wireless management server. Additionally, the authorizations and parameters specify the changes and permissions that the remote client may add, move, change, or delete when connected to the block of numbers. Different permissions and authorizations may be set for different users.

The wireless management server bills the enterprise a flat rate based on the service agreement (step 306) with the process terminating thereafter. The flat rate may be based on the block of numbers provisioned. Alternatively, the service agreement may specify that the enterprise may make unlimited changes, a limited number of changes, or a limited number of specified changes, such as adding or deleting a wireless device from service. In another embodiment, the enterprise may be billed based on usage, per wireless numbers, or any other combination of plans, features, and usage.

Figure 4:
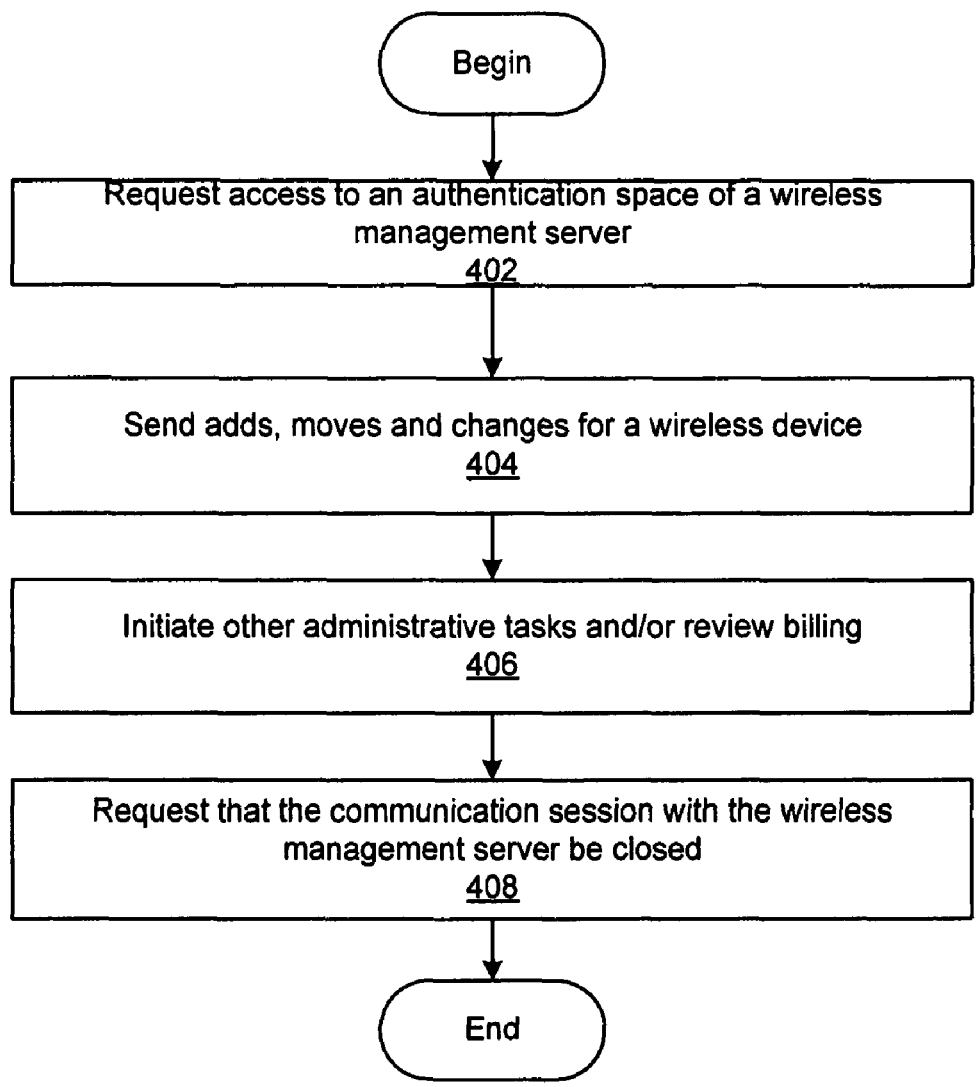
FIG. 4 is a flowchart of a process for performing administrative options with a remote client in accordance with the illustrative embodiments of the present invention.

FIG. 4 is a flowchart of a process for performing administrative options with a remote client in accordance with the illustrative embodiments of the present invention. The process of FIG. 4 may be implemented by a remote client. The user may use a specialized client or graphical user interface and program application running on a data processing system to provide input to the remote client. The process begins by requesting access to an authentication space of a wireless management server (step 402). The request may be initiated by a user selecting to open a program application, creating a virtual private network tunnel between the client and the wireless management server or submitting a user name, password or other identifier.

Next, the remote client sends adds, moves and changes for a wireless device (step 404). Step 404 may be performed for any number of wireless devices accessible by the remote client as established by permissions and provisioning. For example, the remote client may be used to activate a new wireless device, associate new user information with a wireless device, add voicemail, caller identification, and three-way calling, or discontinue wireless service for a lost, stolen, or broken device. If a wireless device is stolen, the remote client may be used to delete personal information, disable service, use global positioning services to locate the device, or perform other operations as desired. Next, the remote client may initiate other administrative tasks and/or review billing (step 408). During step 408, the remote client may be used to review wireless usage of minutes, email, text messaging or other features and services. Additionally, the remote client may be used to send administrative messages to wireless devices and review billing status.

Next, the remote client requests that the communication system with the wireless management server be closed (step 408). Step 408 may be implemented based on a user request. Alternatively, if the remote client or wireless management server does not detect activity for a specified amount of time, a time-out may cause the communication section to close for convenience or security. In another embodiment, an organization may include a number of remote clients, but only one, or a specified number of users may access the wireless management server at any given time.

Figure 5:
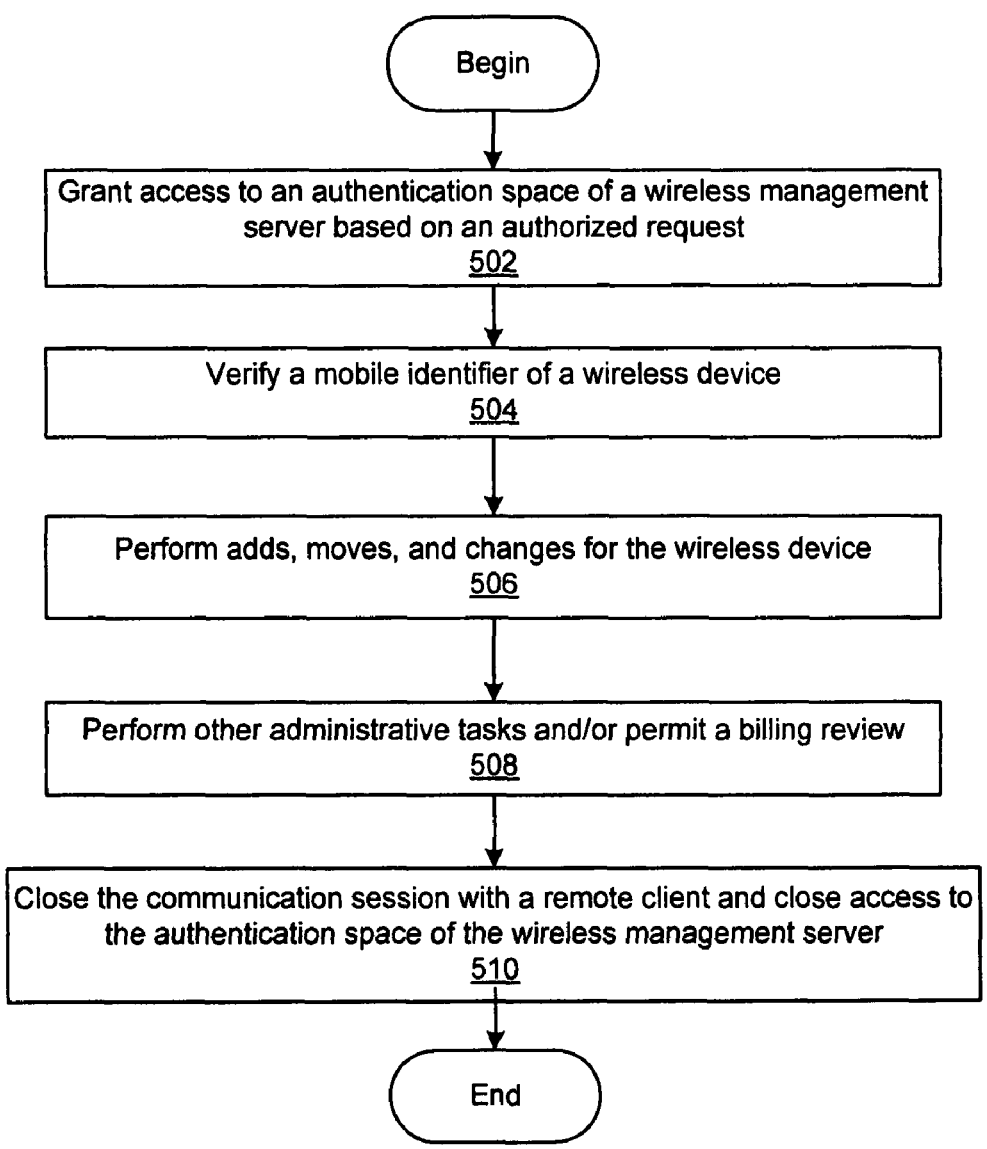
FIG. 5 is a flowchart of a process for performing administrative operations from a remote client in accordance with the illustrative embodiments of the present invention.

FIG. 5 is a flowchart of a process for performing administrative operations from a remote client in accordance with the illustrative embodiments of the present invention. The process of FIG. 5 may be implemented by a wireless management server. The wireless management server may be a single device or multiple interconnected devices. The steps of FIG. 5 may be performed in response to signals, messages, or other data or prompts received from a remote client. A user or other enterprise may use a graphical user interface displayed on the remote client to send the data to the wireless management client.

The process of FIG. 5 begins by granting access to authentication space of a wireless management server based on an authorized request (step 502). The authentication space may be the portion of the wireless management server to which a specified remote client has been granted permissions and access. Access to the authentication space may be granted through a secure communication link or connection, such as a virtual private network (VPN) tunnel. In one embodiment, the authorized request may include a username and password indicating that a user is authorized to access the wireless management client through the remote client.

Next, the wireless management server verifies a mobile identifier of a wireless device (step 504). The mobile identifier may be a phone number, serial number, or other assigned identifier used to identify the wireless device. The mobile identifier may be associated with wireless services, features, and user information. The mobile identifier may also be used to ensure that the remote client is authorized to make changes for the wireless device.

The wireless management server performs adds, moves, and changes for the wireless device (step 506). The adds, moves, and changes performed by the wireless management server allow the enterprise to efficiently manage a number of wireless devices without making requests or changes through customer service. As a result, the changes are immediately made and the wireless device is immediately configured for a designated purpose. The changes may be made through signals or messages sent to each wireless device over a wireless network and wireless network equipment networked to the wireless management server.

For example, Enterprise A hires a new employee. The new employee is expected to travel immediately to various businesses. In order to communicate with the home office of Enterprise A, the new employee needs a wireless device equipped for mobile voice conversations, email, and text messaging. An administrator of Enterprise A uses a remote client to access the wireless management server, register a previously unused smart phone, and add the necessary functions and features that the new employee will need to perform assigned tasks and paid responsibilities.

Next, the wireless management server performs other administrative tasks and/or permits a billing review (step 508). Step 508 allows an enterprise to implement various administrative tasks remotely. The administrative tasks may include software updates, permission changes, and other tasks and any number of other features frequently performed for wireless communication and data processing systems. The enterprise may also be permitted to see how adds, moves, and changes affect the amount the enterprise is billed by the wireless service provider operating the wireless management server.

The wireless management server closes the communication session with a remote client and closes access to the authentication space of the wireless management server (step 510) with the process terminating thereafter. Step 510 may be performed based on a request from the remote client or based on an inactivity timer of the wireless management server. For example, the communication session with the remote client may be automatically closed if the wireless management server determines that there has been no activity on the enterprise GUI or remote client for ten minutes.

In order to alleviate coordination with a wireless carrier, the enterprise is provided with a system and method to provision wireless devices at the enterprise location. A role-based remote provisioning system allows adds, moves, changes to handsets, data cards, and radio frequency (RF) interfaces. A remote client that access the management server or host may be software that is loaded onto an existing system or a dedicated device that enables the enterprise to make changes traditionally reserved for wireless system administrators. The remote client may use any number of peripheral devices integrated or external to the remote client for identifying, reading, and interacting with wireless devices. For example, radio frequencies or bar code readers may be used to identify and communicate with a wireless device that is being reconfigured.

The wireless carrier back office management systems such as provisioning, billing, and network change command systems enable the administrative software and/or remote client to perform a specified subset of functions. The interface with the wireless carrier may be a specific server/client communication function that acts as a gateway between the remote client and wireless host systems. Alternatively, the remote client may communicate directly with different components of the host systems. The wireless host systems work in concert with the remote client and/or gateway system to provide specific operational add, move, and changes to the remote client in a limited fashion depending upon the defined type of service "role" the host allows the user. The role and permissions may be set forth in an agreement or other communications package. For example, a package may allow an enterprise to add new devices to the users account and enable features on wireless devices. Examples of configurable features may include, push to talk long distance, geo-tracking, and bandwidth allocation in the case of data devices.

The previous detailed description is of a small number of embodiments for implementing the invention and is not intended to be limiting in scope. The following claims set forth a number of the embodiments of the invention disclosed with greater particularity.

What is claimed is:

1. A method for providing wireless services, said method comprising:
    storing a plurality of wireless identifiers in an authentication space of a server operated by a wireless service provider, the authentication space being a partition of a storage component of the server that is designated to an enterprise and the wireless identifiers being associated with wireless devices used by employees of the enterprise, the wireless service provider providing wireless service to the wireless devices, wherein the plurality of wireless identifiers are allocated for use only by the enterprise and include wireless identifiers not currently assigned to any wireless device;
    granting a remote client access to the authentication space to allow the enterprise to manage services associated with the plurality of wireless identifiers; and
    altering managed service options associated with one or more wireless identifier, the managed service options being altered in response to receiving data from the remote client, wherein altering managed service options associated with the one or more wireless identifier includes an option for the enterprise to assign a wireless identifier within the plurality of wireless identifiers that is not currently assigned to any wireless device to a wireless device, wherein the assignment of the wireless identifier to the wireless device occurs without requiring additional assistance from the wireless service provider to effect the assignment of the wireless identifier to the wireless device.

2. The method according to claim 1, further comprising:
    specifying authorization and permissions for the remote client.

3. The method according to claim 1, wherein the one or more wireless identifiers are a block of numbers for the wireless devices.

4. The method according to claim 3, wherein each of the one or more wireless identifiers are associated with a wireless device.

5. The method according to claim 4, wherein the wireless device is any of a cellular phone, personal digital assistant, laptop, computer, personal digital assistant, multi-mode device, and evolution data optimization card.

6. The method according to claim 1, further comprising:
    establishing a remote wireless management agreement between the wireless service provider and the enterprise.

7. The method according to claim 1, further comprising:
    billing the enterprise a fee based on the one or more wireless identifiers.

8. The method according to claim 1, wherein the managed service options are account options or adds, moves, and changes to features of the wireless services.

9. The method according to claim 7, wherein the fee is a flat fee for service and the enterprise is not billed for each add, move, or change.

10. The method according to claim 1, wherein selecting the managed service options is performed by a network management server based on commands received through an enterprise graphical user interface.

11. A wireless management system for providing wireless services, said system comprising:
    a first server associated with the management of wireless services operated by a wireless service provider, the first server including an authentication space, the authentication space being a partition of a storage component of the first server that is designated to an enterprise and the first server being operable to authenticate the enterprise communicating with the first server using a remote client, the authentication space containing a plurality of wireless identifiers allocated for use only by the enterprise which includes wireless identifiers not currently assigned to any wireless device, wherein the first server communicates with the remote client for receiving user input; and
    a second server operable to receive commands from the first server in response to the received user input, the second server operable to implement managed service options for a plurality of wireless devices associated with employees of the enterprise in response to the received commands, wherein implementing managed service options associated includes assigning a wireless identifier within the plurality of wireless identifiers that is not currently assigned to any wireless device to a wireless device based on the received user input from the enterprise, wherein the assignment of the wireless identifier to the wireless device occurs without requiring the wireless service provider to perform any additional step to effectuate the assignment of the wireless identifier to the wireless device.

12. The wireless management system according to claim 11, wherein the remote client is in communication with the first server and, wherein the authentication space authenticates the enterprise using a secure identifier.

13. The wireless management client system according to claim 11, wherein the wireless network is a cellular network.

14. The system according to claim 11, wherein the plurality of wireless devices are any of a cellular phone, personal digital assistant (PDA), laptop, evolution data optimized (EDO) card, WiFi card, and WiMAX card.

15. The system according to claim 11, wherein the remote client is accessible by the enterprise for managing the wireless services of the plurality of wireless devices without interaction from the personnel of a wireless services provider operating the first server and the second server.

16. A method for providing wireless services, said method comprising:
    granting access to an authentication space of a server operated by a wireless service provider in response to a request from a remote client associated with an enterprise, the authentication space being a partition of a storage component of the server that is designated to the enterprise, the authentication space containing a plurality of wireless identifiers allocated for use only by the enterprise which includes wireless identifiers not currently assigned to any wireless device;

verifying that a mobile identifier of a wireless device is associated with the authentication space, the mobile identifier being identified by the remote client and being associated with an employee of the enterprise;

receiving a request to alter a wireless service for the wireless device from the remote client; and implementing the request to alter the wireless service of the wireless device, wherein altering includes removing wireless service from the wireless device, wherein removal of the wireless service from the wireless device is effectuated without additional assistance of the wireless service provider.

17. The method according to claim 16, further comprising: permitting other authorized account options and billing review from the remote client.

18. The method according to claim 16, further comprising: closing the authentication space of the wireless management client.

19. The method according to claim 16, further comprising: requesting access to the authentication space;
sending one or more mobile identifiers to the server; and
requesting the managed service option.

20. The method according to claim 19, wherein the requesting and sending steps are performed by the remote client based on user input from the enterprise.

21. The method according to claim 20, wherein the user input is received using an enterprise graphical user interface, wherein the enterprise is a consumer.

22. The method according to claim 16, further comprising: designating a separate authentication space for each of a plurality of remote clients for managing the wireless services for each of a plurality of consumer enterprises.

\* \* \* \* \*